Dec. 19, 1939.　　J. M. BOWEN ET AL　　2,183,638
SLED
Filed Dec. 30, 1936
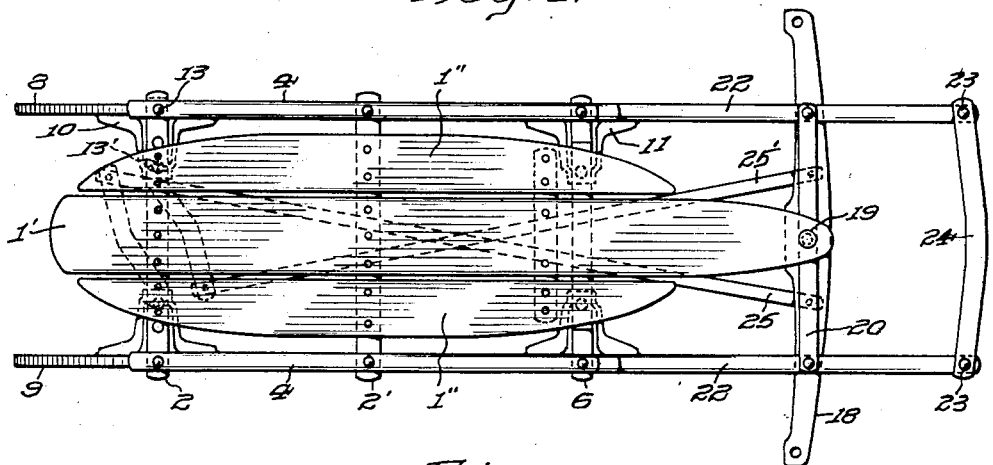
INVENTORS
James Monroe Bowen,
Frank G. Birkhead.
WITNESS Patented Dec. 19, 1939

2,183,638

UNITED STATES PATENT OFFICE 2,183,638

SLED

James Monroe Bowen, Cape May Court House, N. J., and Frank G. Birkhead, Philadelphia, Pa., assignors to S. L. Allen & Co., Inc., Philadelphia, Pa., a corporation of Pennsylvania Application December 30, 1936, Serial No. 118,276

18 Claims. (Cl. 280—22)

Our invention relates to coasting sleds having laterally bendable runners and is directed particularly to novel means for bending them to afford improved steering qualities.

Sleds of this general character have heretofore included rigid cross benches having the runners secured to them in pivotal relation through the medium of runner brackets or knees and mechanism for positively shifting one of the benches and/or the front upwardly curved ends of the runners relatively to the sled deck so as to bend the runners laterally in response to movements of the shifting mechanism.

In such sleds, however, the steering mechanisms with which we are familiar are so constructed that the bending of the runners so induced is largely localized in their upwardly curved regions adjacent the front end of the sled, which regions are substantially free of contact with the snow or ice when the sled is in use, with the result that a large part of the effort involved in steering the sled is expended in bending parts of the runners which have no appreciable steering effect.

A principal object of this invention therefore is to provide in a steering sled having laterally bendable runners, improved steering means operative to bend those portions of the runners in contact with the snow or ice over which the sled is travelling with but a minimum of bending in the portions which are out of contact therewith and thus do not participate in determining the direction of sled travel.

Another object is the provision of sled steering means operative to bend the portions of the runners effective to steer the sled with but a minimum of effort in response to movements of the steering bar.

A further object is the provision of mechanism operative to effect independent pivotal movement of the rear runner brackets or knees on opposite sides of the sled to bend the runners relatively sharply adjacent the rear of the sled without appreciable bending of their forward upwardly curved parts.

Still further objects and novel features of design, construction and arrangement comprehended by the invention are hereinafter more fully disclosed or will be apparent from the following description of a sled constructed in accordance with one embodiment thereof and illustrated in the accompanying drawing in which:

Fig. 1 is a top plan view of the sled with the runners in normal or straight line position;

Fig. 2 is a side elevation thereof, and

Fig. 3 is a bottom plan view of the sled shown in the preceding figures but with the runners bent to the position they occupy when the sled is being turned sharply to the left.

Like numerals are used to designate the same parts in the several figures.

As shown, the sled comprises a top or deck generally designated as 1 and including a longitudinally extending center strip or panel 1' and outer panels 1" disposed on either side thereof, the center panel being considerably longer than the side panels and extending forwardly beyond the front ends of the latter. The panels are held together by transversely extending benches 2, 2' and a cleat 3 to which they are nailed or otherwise suitably secured. The benches 2, 2', respectively disposed near the rear ends of the panels and at about the middle thereof, are of sufficient length to extend beyond their side edges to form supports for the side rails 4, 4 which are rigidly secured at the ends of the benches and with the panels form the sled deck. The cleat 3 is desirably made somewhat shorter than the benches and only serves to tie the panels together adjacent their front ends. Vertical support is, however, afforded to the front end of the deck by another bench 6 extending transversely of the sled beneath the deck but preferably unsecured thereto, the deck, including the side rails, merely resting on this bench and these parts being thus relatively slidable.

For holding the deck in properly spaced relation to the runners 8, 9, which are of well-known form, and connecting the parts together, suitable brackets 10, 11 are employed and while these may be of any desired character, we ordinarily prefer to use brackets made from sheet metal and comprising downwardly diverging legs and a flat top portion which forms a suitable seat for the superjacent bench. One pair of brackets 10 may be disposed beneath the rear bench 2 and riveted or otherwise secured to the runners as by rivets 12 and also to the bench as by rivets 13, 13', the rivets 13 also serving to hold the upwardly and forwardly turned rear ends of the runners between the bench 2 and the side rails, while another pairs of brackets 11 may be similarly disposed beneath the bench 6 and secured to it by rivets 14 and to the runners by rivets 12. However, as it is desirable that the rear brackets 10 be capable of oscillatory movement with respect to the bench 2, we prefer to arrange for the same by providing the flat top portions of the brackets with slots 15 for the passage of the inner rivets 13'. Thus, when the runners are flexed as hereinafter described, the outermost rivets 13 act as pivots about which the adjacent brackets and the rear parts of the runners are free to turn through limited arcs.

The several parts to which we have heretofore referred are of the general character of those embodied in certain types of steering sleds at present in use and thus require no further or more extended description.

Reference will now be made more particularly to the mechanism directly concerned with the steering of the sled and to which the improvements of the present invention especially relate. This mechanism comprises the usual steering bar 18 disposed adjacent the front end of the center panel and extending transversely of the sled. This steering bar, which is of sufficient length to project beyond the side rails to enable the operator to push or pull on one end or the other thereof to steer the sled, is pivotally secured to the center panel by a bolt 19 which also extends through a cross bar 20 interposed between the panel and the handle bar and is held in place by a nut 21. The ends of this cross bar are riveted to side bars 22 constituting in effect rigid extensions or parts of the side rails 4 and extending to the front ends of the runners 8, 9 to which they are pivoted by rivets 23 and an additional cross bar or bumper 24 is connected between these runner ends by the same rivets. If desired each side bar and its rail may be made as a single continuous member.

The steering bar is connected to the rear runner brackets through steering rods 25, 25' which at their front ends are pivoted to the bar on opposite sides of its pivot bolt 19 by pivot pins 26, 26', and, crossing lines drawn between the pivot bolt 19 and the rivets 13, 13' respectively, are secured by pivot pins 27, 27' to the free ends of arms 28, 28' which extend oppositely inwardly from the rear runner brackets beyond the longitudinal center line of the sled. These arms which are rigidly secured to their respective brackets by rivets 29, 29' as well as by the rivets 13 on which they and the brackets are pivoted to the rear bench, are so formed as to permit their limited oscillation about these pivots without interfering with each other.

It is believed it will be readily apparent from an inspection of the drawing in the light of the foregoing description that a sled constructed substantially in accordance therewith may be steered in either direction as desired by pushing on one end or the other of the steering bar 18 so as to exert a forward pull on one steering rod and a rearward push on the other, and correspondingly move the steering arms and runner brackets 10 about their pivots 13 to thereby positively bend the portions of the runners adjacent thereto, the forward ends of the latter moving slightly about their pivotal connections with the bumper and side members and the intermediate bench 6 sliding transversely of the deck in response to the runner movement so induced. Thus but relatively little lateral bending takes place in the forward upwardly curved portions of the runners while their generally horizontal parts which contact the supporting surface can be bent relatively sharply with but a minimum of effort due to the mechanical advantage of the leverages involved. It is therefore possible to make much sharper and quicker turns, with resulting enhancement of the pleasure derived from use of the sled and decrease in the liability of accident, than with the older types in which the forward upwardly curved portions of the runners are severely twisted whenever the sled is steered, yet without in any way reducing the speed of the sled under similar operating conditions.

Furthermore in sleds in which the runners are bent most sharply forward of the center of the sled, there is considerable tendency for the rear of the sled to "skid" and/or for the occupant to be thrown off by sidesway in making a turn; in our sled, however, as the runners are bent most sharply to the rear of the center and less sharply forwardly thereof, this "skidding" tendency and discomfort to the occupant through sidesway are substantially entirely eliminated, and the retarding effect on the speed of the sled itself which usually accompanies skidding and sidesway is likewise absent.

While we have herein illustrated and described with considerable particularity a sled constructed in accordance with a preferred embodiment of the invention, we do not thereby desire or intend to limit ourselves to any specific features of design, construction or arrangement of the various parts as changes and modifications may be made therein as desired within the spirit and scope of the invention as defined in the appended claims.

Having thus described our invention we claim and desire to protect by Letters Patent of the United States:

1. A steering sled having laterally bendable runners, a deck disposed therebetween, means for holding a part of each runner laterally fixed with respect to the deck, brackets carried by the runners remote from said means, a slidable cross bench carried by one of the brackets on each runner affording vertical support to the forward part of the deck, a second bench rigidly secured to the deck in rear of the first bench having pivotal connections with another bracket on each runner, a steering bar pivoted to the forward end of the deck and means interposed between the steering bar and the pivoted brackets adapted to oscillate said brackets in correspondence with movements of the steering bar to thereby bend the runners laterally to slide the first bench transversely of the deck.

2. A steering sled having laterally bendable runners, a deck disposed therebetween, brackets carried by the runners, a cross bar interconnecting the front ends of the runners, side rails extending rearwardly from said ends on opposite sides of the deck, a cross bench beneath the side rails positively connected to a subjacent pair of runner brackets adapted for movement relatively to the deck, a rear cross bench rigidly connected with the side rails and deck and having pivotal connections with another pair of runner brackets, means carried by the last mentioned brackets for oscillating them about their pivots, a pivoted steering bar and means interconnecting the steering bar with the runner bracket oscillating means.

3. A steering sled having laterally bendable runners, a deck disposed therebetween, a cross bar interconnecting the front ends of the runners, rigid side rails extending between said cross bar and the deck, brackets carried by the runners, longitudinally spaced cross benches interposed between the runner brackets and the deck, the forward cross bench being transversely slidable with respect to the deck and the rear cross bench having pivotal connections with a transversely aligned pair of subjacent brackets, a steering bar pivoted adjacent the front end of the sled and means interconnecting the steering bar with said pivotally connected runner brackets operable to oscillate them about their pivots to bend the runners along substantially parallel arcs and cause the front bench to slide in response to movements of the steering bar.

4. A steering sled having laterally bendable runners, a deck disposed therebetween, means rigid with the deck affording fixed pivots for the front ends of the runners, a transversely aligned pair of brackets carried by the runners having pivotal connections with and affording vertical support to the deck, arms carried by the brackets extending oppositely inward of the deck beyond its longitudinal center line, a pivoted steering bar and connecting rods respectively pivoted at one end thereto and at their other ends to the inwardly projecting ends of the arms and extending angularly oppositely across said center line for oscillating the brackets about their pivots in correspondence with movements of the steering bar to bend the runners and move their front ends on said fixed pivots.

5. In a steering sled having a laterally bendable runner, a rigid side rail above the runner affording a fixed pivot for the front end thereof and a deck, a runner bracket interposed between the runner and the deck, rigidly secured to the runner and pivoted for limited oscillation with respect to the deck, an arm carried by the bracket, a steering bar pivoted adjacent the longitudinal center line of the deck and a steering rod pivoted to the arm and the bar and extending therebetween angularly across said line adapted to move the arm in correspondence with the movements of the bar about its pivot to bend the runner and move its front end about said fixed pivot.

6. In a steering sled having laterally bendable runners and a deck, the front ends of the runners being movable on pivots fixed relatively to the deck, a pair of runner brackets respectively interposed between the runners and the deck in pivotal relation to the latter and steering means directly connected with the brackets operable to oscillate them about their pivots to thereby bend the runners along substantially parallel arcs and move the front ends of the runners on said fixed pivots to steer the sled.

7. In a steering sled having a laterally bendable runner and a deck, means for pivotally holding a part of the runner in laterally fixed relation to the deck, a runner bracket secured to the runner at a point spaced from said part for pivotal movement with respect to the deck, a steering bar spaced from the bracket extending transversely of the sled in pivotal relation to the deck and a steering rod pivoted to the steering bar extending angularly across the line between the pivotal centers of the bracket and bar having a direct connection with the bracket for positively moving it about its pivot in correspondence with movements of the bar to thereby bend the runner and to move said part about its pivot.

8. In a steering sled having a pivoted steering bar and laterally bendable runners with their front ends movable on fixed pivots, brackets rigidly secured to the runners and adapted for pivotal movement about parallel axes, an arm carried by each bracket and means interconnecting the steering bar and the arms for oscillating the brackets in correspondence with movements of the bar to bend the runners and to move their front ends on said fixed pivots.

9. In a steering sled having laterally bendable runners, a deck and means for pivotally holding the front ends of the runners laterally fixed with respect to the deck, a pivoted bracket rigidly secured to each runner, an arm carried by each bracket and means for simultaneously moving the arms in opposite directions to thereby oscillate the brackets about their pivots to bend the runners along substantially parallel arcs and pivotally move their front ends.

10. In a steering sled having laterally bendable runners, a deck, means for pivotally holding a part of each runner laterally fixed with respect to the deck, a pivoted bracket carried by each runner remote from said part, arms respectively secured to the brackets and extending oppositely inward beneath the deck, a steering bar pivoted to the deck and means interconnecting the bar and the arms operable to move the arms in opposite directions to oscillate the brackets on their pivots.

11. In a steering sled having a laterally bendable runner, means for bending the runner comprising a pivoted bracket rigidly secured to the runner, means for positively oscillating the bracket about its pivot and means spaced from the bracket for holding a part of the runner laterally fixed with respect to the bracket pivot.

12. A steering sled having laterally bendable runners, a deck disposed therebetween, means rigid with the deck and secured to the front ends of the runners for holding said ends in oppositely spaced relation to the center line of the deck, brackets carried by the runners, cross benches carried by the brackets and affording vertical support to the deck, one of the benches being adapted for movement transversely of the deck and another having pivotal connection with the subjacent brackets, arms respectively carried by the last mentioned brackets extending oppositely inward beneath the deck, a steering bar pivoted adjacent the forward end of the deck and steering rods pivoted to the bar at points oppositely spaced with respect to its pivotal center and having pivotal connections with the arms respectively carried by the runner brackets.

13. A steering sled having laterally bendable runners and a deck, means rigid with the deck and secured to the front ends of the runners for holding said ends against lateral movement, a steering bar pivoted adjacent the front end of the deck, brackets arranged for oscillation with respect to the deck interposed between it and the rear parts of the runners, arms respectively extending oppositely inward from said brackets beneath the deck and steering rods respectively interconnecting said arms with the steering bar on opposite sides of its pivotal center adapted to oscillate the brackets in correspondence with movements of the steering bar to thereby bend the runners adjacent said brackets.

14. In a steering sled having a laterally bendable runner and a deck, means for holding a part of the runner in laterally fixed relation to the deck, a runner bracket secured to another part of the runner and adapted for oscillation relatively to the deck, a transversely extending steering bar disposed in pivotal relation to the deck at a point remote from the bracket and a steering rod interconnected with said bar and bracket at points spaced from their respective pivotal centers for oscillating the bracket in correspondence with movements of the bar to thereby bend the runner between its said parts.

15. In a steering sled having laterally bendable runners, a deck, means rigid with the deck for holding the front ends of the runners in substantially fixed laterally spaced relation to the longitudinal center line of the deck, a bracket carried by a rear part of each runner pivotally interconnected with the deck, arms respectively carried by the brackets and extending oppositely inward beneath the deck, a steering bar disposed in pivotal relation to the deck, and means interconnecting the bar and the arms operable to move the arms in opposite directions to oscillate the brackets on their pivots in correspondence with movements of the bar.

16. A sled body provided with laterally flexible runners, pivotal connection between the body and the rear portions of said runners, the front ends of the runners being secured and their middle portions being free, so that skewing the rear ends of the runners in one direction serves to bow and shift the middle portions laterally in the opposite direction, whereby the rear end steering is done with the flexible rear ends of the runners, and forward steering gear connected by rearwardly extending connecting means to said pivotal connection, and through the latter to the rear end portions of the runners, thereby for controlling the flexing of the runners.

17. A sled having flexible runners secured at their front ends, swiveled at their rear ends, and free at their middle portions, and manual steering gear connected to the rear ends of said runners, to flex said ends laterally, the flexing of the rear ends in one direction serving to bow and shift said free middle portions laterally in the opposite direction, thereby to steer the sled.

18. A sled body provided with laterally flexible runners, pivotal connection between the body and the rear portions of said runners, for flexing the latter to the right or left, so that rear end steering is done with the flexible rear ends of the runners, and forward steering gear connected by rearwardly extending connecting means to said pivotal connection, and through the latter to the rear end portions of the runners, thereby for controlling the flexing of the runners, said pivotal connection comprising brackets rigid with the runners and pivoted on the under side of the rear portion of said body to each oscillate about a vertical axis, with said connecting means fixed on each bracket a distance from said axis.

JAMES MONROE BOWEN.
FRANK G. BIRKHEAD.